United States Patent
Thomas (10) Patent No.: US 9,746,138 B1
(45) Date of Patent: Aug. 29, 2017

(54) MODULAR LIGHTING AND ANCILLARY COMPONENT APPARATUS AND SYSTEM

(71) Applicant: John-Michael Dimitro Thomas, Los Angeles, CA (US)

(72) Inventor: John-Michael Dimitro Thomas, Los Angeles, CA (US)

( * ) Notice: Subject to any disclaimer, the term of this patent is extended or adjusted under 35 U.S.C. 154(b) by 0 days.

(21) Appl. No.: 15/361,031

(22) Filed: Nov. 24, 2016

(51) Int. Cl.
| | |
|---|---|
| *G06F 13/38* | (2006.01) |
| *F21K 9/238* | (2016.01) |
| *G06F 13/42* | (2006.01) |
| *H05B 37/02* | (2006.01) |
| *H05B 33/08* | (2006.01) |
| *F21K 9/237* | (2016.01) |
| *H04W 84/02* | (2009.01) |
| *F21K 9/232* | (2016.01) |
| *F21V 3/02* | (2006.01) |
| *F21Y 115/10* | (2016.01) |
| *H04R 1/02* | (2006.01) |

(52) U.S. Cl.
CPC .............. *F21K 9/238* (2016.08); *F21K 9/237* (2016.08); *G06F 13/385* (2013.01); *G06F 13/4282* (2013.01); *H05B 33/0845* (2013.01); *H05B 37/0254* (2013.01); *F21K 9/232* (2016.08); *F21V 3/02* (2013.01); *F21Y 2115/10* (2016.08); *H04R 1/028* (2013.01); *H04W 84/02* (2013.01)

(58) Field of Classification Search
CPC . F21K 9/20; F21K 9/237; F21K 9/238; F21K 2099/005
See application file for complete search history.

(56) References Cited

U.S. PATENT DOCUMENTS

| | | | |
|---|---|---|---|
| 8,232,745 B2 | 7/2012 | Chemel et al. | |
| 9,157,624 B2 | 10/2015 | Nourbakhsh et al. | |
| 9,163,816 B2 | 10/2015 | Baschnagel | |
| 2011/0234082 A1 | 9/2011 | Cao | |
| 2012/0187835 A1* | 7/2012 | Jonsson | F21V 23/04 315/51 |
| 2014/0049972 A1* | 2/2014 | McGuire | F21V 21/00 362/427 |
| 2014/0056001 A1 | 2/2014 | Hsu et al. | |

(Continued)

FOREIGN PATENT DOCUMENTS

TW 201512594 A 4/2015

OTHER PUBLICATIONS http://www.gelighting.com/LightingWeb/na/solutions/led-lamps-and-modules/infusion-led-module/overview/index.jsp, downloaded/printed Nov. 24, 2016.

(Continued)

*Primary Examiner* — Glenn A Auve
(74) *Attorney, Agent, or Firm* — Law Office of Thomas J. Brindisi (57) ABSTRACT

A modular lighting and ancillary component apparatus and system utilizes standard USB protocol and connections between modules so that different modules can be selected, installed, and changed by a user. The USB-C protocol is preferably used, which may permit bidirectional functionality between connected modules in an apparatus and potentially between separate apparatuses. The USB-PD protocol may also be employed so that a greater range of items can be powered. The apparatus includes a base module, and may include one or more ancillary modules and/or a light-emitting module.

23 Claims, 11 Drawing Sheets

(56) References Cited

U.S. PATENT DOCUMENTS

| | | | | |
|---|---|---|---|---|
| 2014/0168990 A1* | 6/2014 | Hong | ............... | F21V 29/713 362/294 |
| 2014/0265836 A1* | 9/2014 | Nourbakhsh | ........ | F21V 23/06 315/71 |
| 2016/0073479 A1* | 3/2016 | Erchak | ............... | F21S 9/022 315/51 |
| 2017/0108203 A1* | 4/2017 | Habchi | ............ | F21V 23/009 |

OTHER PUBLICATIONS

GE Data Sheet—Infusion LED Module Application Guide | 66450, downloaded from http://www.gelighting.com/LightingWeb/na/solutions/led-lamps-and-modules/infusion-led-module/overview/index.jsp on Oct. 3, 2016.

* cited by examiner

MODULAR LIGHTING AND ANCILLARY COMPONENT APPARATUS AND SYSTEM

FIELD OF THE DISCLOSURE

The present invention relates to the provision and connection of lighting and other components, and in particular a modular lighting and ancillary component apparatus and system having Universal Serial Bus (USB) functionality.

BACKGROUND

There is a broad array of choices in lighting products, and it can be difficult and time-consuming for a consumer to identify the best option. Further, if a consumer installs a light that winds up being less than optimal, or if the consumer makes changes to an installed light's environment that render the light less appropriate, there is little choice with standard lighting products but to remove a complete lighting apparatus and replace it with a new one. While there are some modular lighting systems that allow for subsidiary modules to be custom-selected by a user and that have parts which can be changed without replacing an entire apparatus, they use proprietary connections.

Light receptacles are also often positioned in places where a user might wish to employ other items instead of or in addition to lighting such as a wireless communication node (e.g., Wi-Fi), speakers, cameras, or sensors. In order to drive down costs, however, LED light manufacturers have largely standardized light tubes and circuit boards in ways that have limited possible additional features (as well as service life). While some products are available that allow electricity from a conventional light receptacle to be used to power such items, they do not provide a seamless solution that includes lighting and allows a consumer to readily undertake post-installation replacement of parts of an apparatus including with a variety of non-lighting items.

SUMMARY OF THE DISCLOSURE

A modular lighting and ancillary component apparatus and system utilizes standard Universal Serial Bus (USB) protocol and connections between modules so that different modules can be selected and installed by product providers and preferably also by consumers. The flexibility and interchangeability of USB connections frees consumers from the proprietary connectors and limited products of existing modular solutions. For example, a consumer may be unhappy with the color, color temperature, color rendering index (CRI), intensity, beam angle, or other aspects of an installed light and wish to change it. In an embodiment, the user can simply remove a LED component or LED module—leaving the rest of the lighting apparatus intact—and replace the component or module with a different one having a more suitable lighting profile.

Likewise, in an embodiment, a consumer can install a module that includes (and/or has external USB connectors for attaching) Bluetooth, Wi-Fi, dimming, camera, sensor, speaker, or other suitable features. This allows such items to be powered from a location that may originally have been designed just for lighting, without the necessity of installing new electrical wiring.

The USB-C protocol is preferably used, providing for the possibility of bidirectional functionality between connected modules in a single location. Depending on the environment, the bidirectionality may also permit communications to be conducted over existing electrical wiring so that various modules at different locations (e.g., in different light receptacles) can coordinate intelligently without the need for wireless communications between them. The USB-Power Delivery (USB-PD) protocol may also be employed to afford increased voltage (beyond the nominal 5 volts of prior USB protocols) so that a greater range of items can be powered.

In one embodiment, the modules include a base module, one or more ancillary modules, and a light-emitting module. In another embodiment, the light-emitting module may be substituted with an ancillary module having a different functionality (e.g., a camera, sensor, speaker, etc.). In another embodiment having a light-emitting module, the ancillary module may be omitted. In another embodiment, the light-emitting module may be configured with a connector for a further module(s) to be connected to the distal end of the light-emitting module, with the light-emitting component being placed on an exterior (e.g., radial) surface of the light-emitting module.

DETAILED DESCRIPTION

An embodiment of a modular lighting and ancillary component apparatus and system is a platform that can turn any standard light bulb receptacle (socket) into a USB adapter/hub and allow for customizable lights and other devices to be installed as discrete modules using existing electrical infrastructure. The root of system is a base module, which is a discrete module that plugs or screws into an existing light bulb (or other similar) socket, transforms the existing power supply, establishes a USB-compliant apparatus. To enable bidirectional communication between modules and potentially between apparatuses connected to separate sockets, modules preferably meet the USB-C specification, preferably further with USB-PD support so that devices requiring more than 5 volts can be powered.

The modules are electrically connected with USB connectors, and preferably also have physical connectors that press-fit or interlock together. The system preferably allows modules to be "daisy-chained" in a customizable fashion so that a user can replace and remove a module to better meet existing needs or to meet new needs. Modules that can be incorporated may include one or more of an array of functionalities such as lighting (preferably LED), light guides, Wi-Fi, bluetooth, speakers, cameras, microphones, sensors, processing centers (e.g., AI), etc. Each module may have one function, or multiple functions may be combined in a single module. For example, a module having Wi-Fi functionality may also include a microphone and processing circuitry such that a user can communicate with the module and provide instructions or information that may be used in home automation or programming, etc. Or a module primarily intended as a speaker may also include an LED for a better aesthetic. The ultimate mix of uses that a given user may adopt is essentially unlimited, but examples include surround sound, security systems, home automation systems, and of course lighting. The advantages over prior means of implementing such functions may include significantly reduced initial cost and increased convenience of installation for some functions, lower cost of replacement, and an ability to rapidly and economically modernize and update a space.

A modular lighting and ancillary component apparatus and system according to an embodiment of the invention utilizes the USB protocol and connections between modules that can be removed and replaced with other modules by a user after installation. FIGS. 1-12 depict various modular lighting and ancillary component apparatuses and parts thereof. One or more of such apparatuses together may, in an embodiment, form a modular lighting and ancillary component system.

Figure 1:
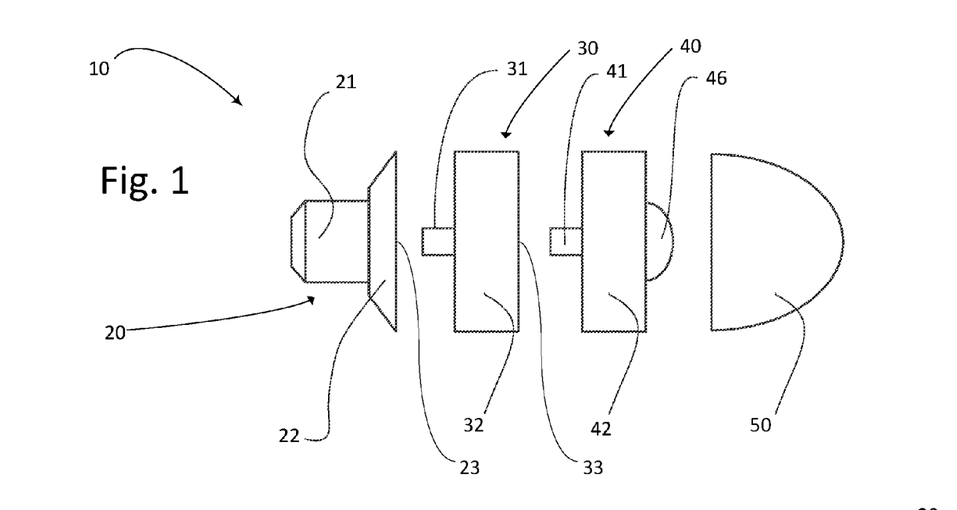
FIG. 1 is a schematic view of an embodiment of a modular lighting and ancillary component apparatus, showing an unconnected base module, ancillary module, light-emitting module, and bulb.

Referring first to FIG. 1, an embodiment of a modular lighting and ancillary component apparatus 10 is depicted that includes a base module 20, ancillary module 30, light-emitting module 40, and bulb 50, each being unconnected but connectable to each other. The base module 20 comprises a power connector 21 (e.g., a standard screw connector for an AC electrical lighting receptacle such as A19), a base module body 22, and a female USB connector 23. The ancillary module 30 comprises a male USB connector 31, ancillary module body 32, and a female USB connector 33. The light-emitting module 40 comprises a male USB connector 41, light-emitting module body 42, and a diffuser 46 over which bulb 50 can be seated. The USB connector orientations could be the reverse of that depicted (i.e., males switched with females and vice versa) or otherwise differently arranged. Also, an adapter could be inserted into a female USB connector that converts it to a male connector. The USB connectors (and those of the embodiments described below) preferably meet the USB-C specification.

Figure 2:
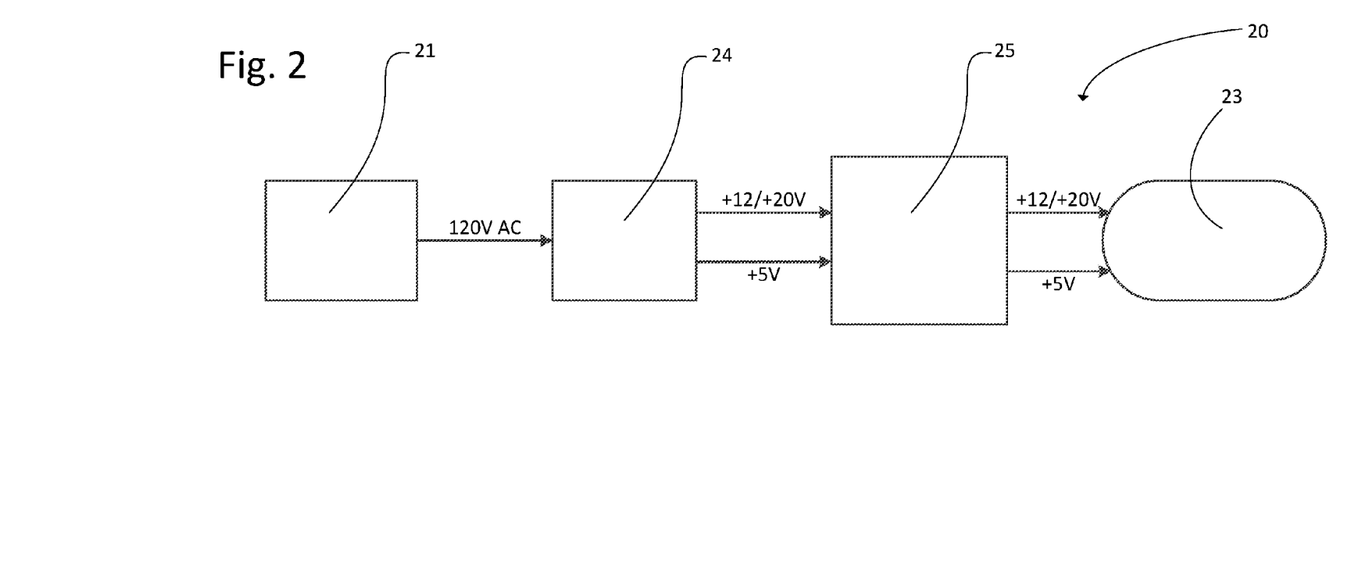
FIG. 2 is a functional block diagram of an embodiment of a base module utilizing USB-C functionality.

FIG. 2 shows the functional design of an embodiment of a base module 20 utilizing USB-C functionality. The base module 20 comprises USB connectors 21 and 23, a DC power supply 24, and USB-C PHY circuitry 25. As the apparatus preferably meets the USB-PD specification, the DC power supply 24, USB-C PHY circuitry 25, and USB connector 23 are each shown connected by two different lines, one being +5V for USB Vbus and the other being +12V/+20V for USB-PD support. Current flow is limited to 3 amps, but the higher voltages of USB-PD allow for the powering of devices with higher power requirements.

Figure 3:
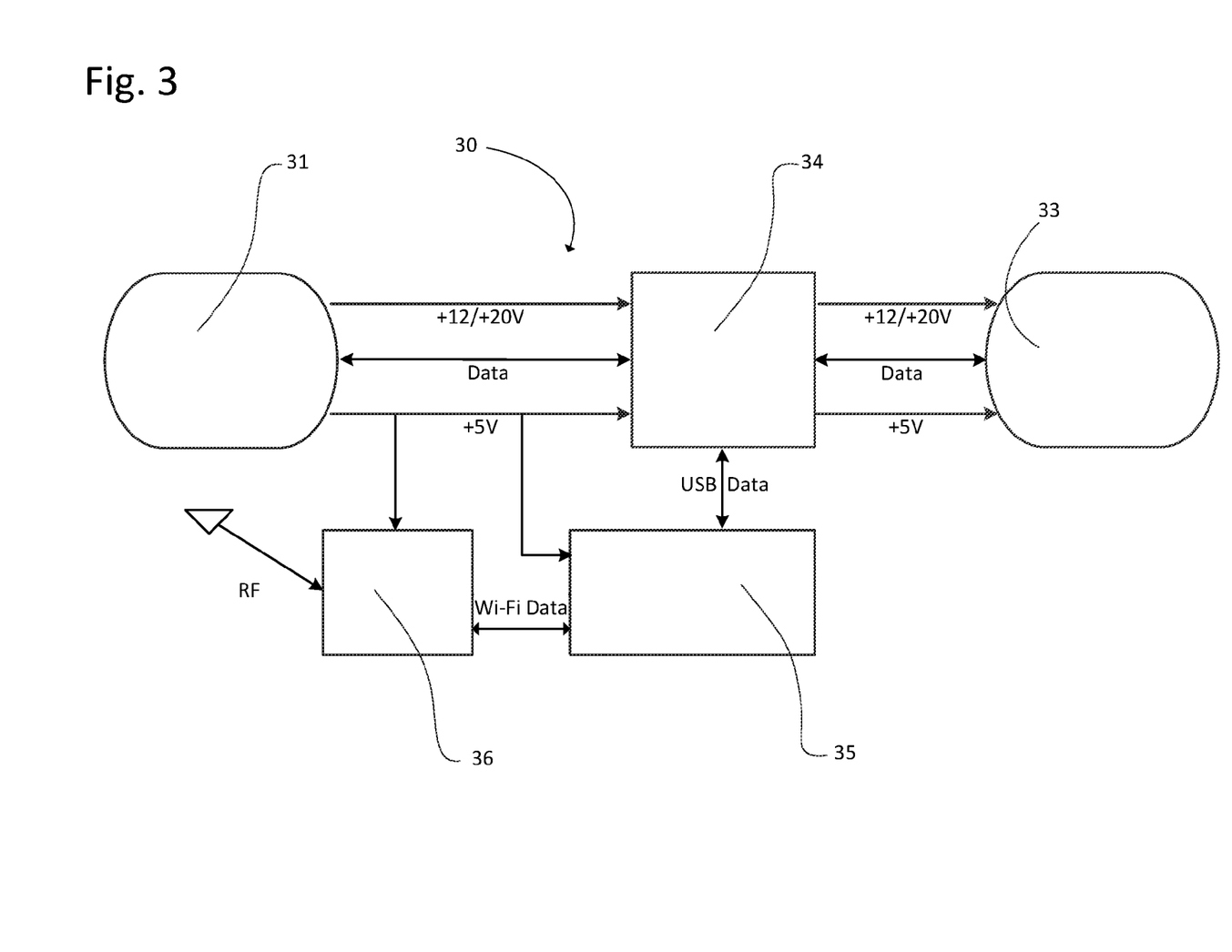
FIG. 3 is a functional block diagram of an embodiment of an ancillary module compatible with the base module of FIG. 2 and having Wi-Fi functionality.

FIG. 3 shows the functional design of an embodiment of an ancillary module 30 compatible with the base module 20 of FIG. 2 and having Wi-Fi functionality. The ancillary module 30 comprises USB connectors 31 and 33 and USB-C PHY circuitry 34, and a microcontroller 35 and Wi-Fi-interface 36. Such an ancillary module 30 may allow the module to join a local network, communicate with controllers, and/or send control information directly to LED bulbs or other devices that are connected as part of the apparatus 10.

Figure 4:
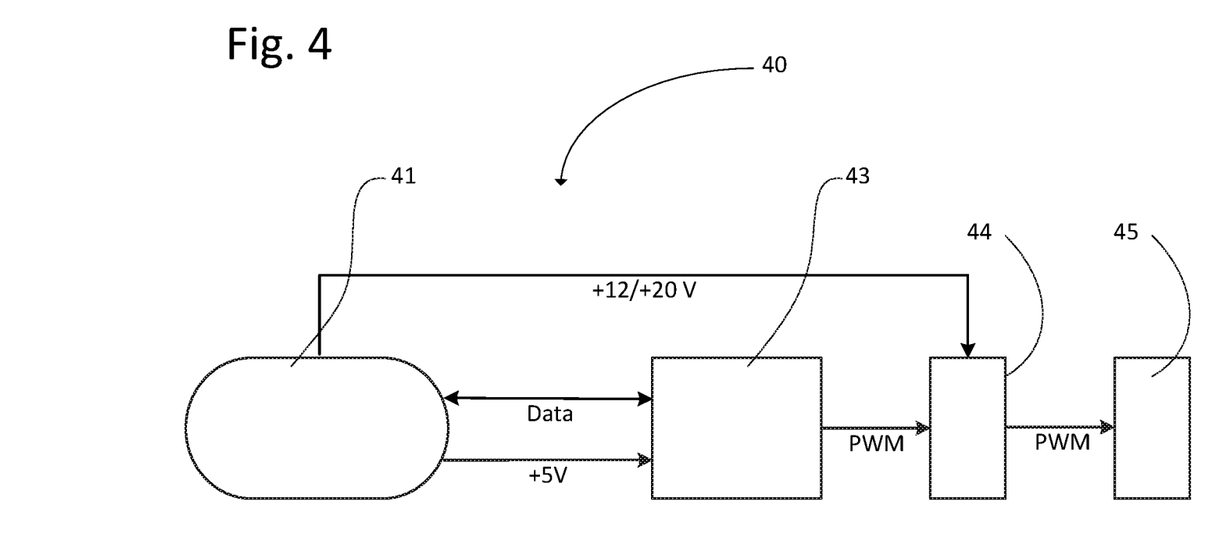
FIG. 4 is a functional block diagram of an embodiment of a light-emitting module compatible with the modules of FIGS. 2 and 3 and having light-emitting diodes.

FIG. 4 shows the functional design of an embodiment of a light-emitting module 40 compatible with the modules 20 and 30 of FIGS. 2 and 3 and having light-emitting diodes (LEDs) 45. The light-emitting module 40 further comprises a USB connector 41, a microcontroller 43, and power FETs (field effect transistors) 44. A range of single-color and color-configurable LEDs 45 may be used, and dimming and color-configuration (e.g., via a Wi-Fi link) may be supported. Configuration settings are preferably retained through power cycles (e.g., in non-volatile memory), and simple on/off control is preferably also supported.

Figure 5:
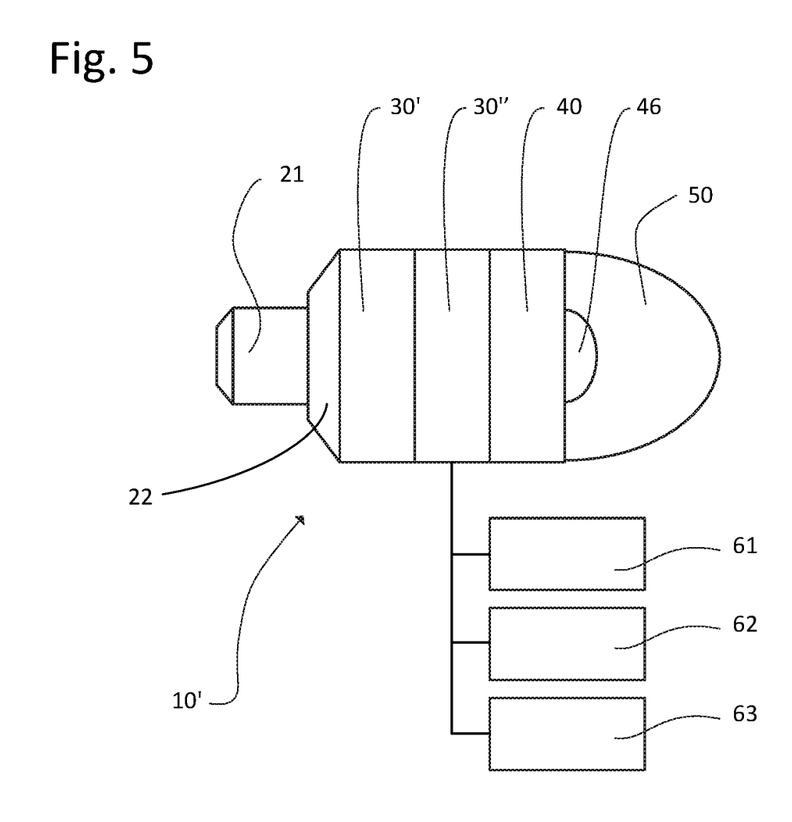
FIG. 5 is a schematic view of an embodiment of a modular lighting and ancillary component apparatus similar to that of FIG. 1, but with the modules connected and including a second ancillary module having USB hub functionality.

FIG. 5 depicts an embodiment of a modular lighting and ancillary component apparatus 10' similar to that of FIG. 1, but with the modules connected and including an ancillary module 30' having Wi-Fi functionality and another ancillary module 30" having USB hub functionality. The modular lighting and ancillary component apparatus 10' further comprises a power connector 21 (e.g., an A19 screw connector), a base module body 22, a light emitting module 40 and diffuser 46 and bulb 50. External ancillary components can (as shown) be connected to the ancillary module 30", such as speakers 61, sensors 62 (e.g., for home automation), and a camera 63. The ancillary module 30" provides a USB compliant hub to connect external peripherals to the power and Wi-Fi systems of the apparatus. The USB controller preferably is USB-C and is aware of device power consumption and may for example be configured to reduce power to one or more ancillary devices in favor of lighting, or vice versa. The ancillary module 30" preferably acts as a tunnel for data from each attached device to a system controller (not shown) via the Wi-Fi link.

Figure 6:
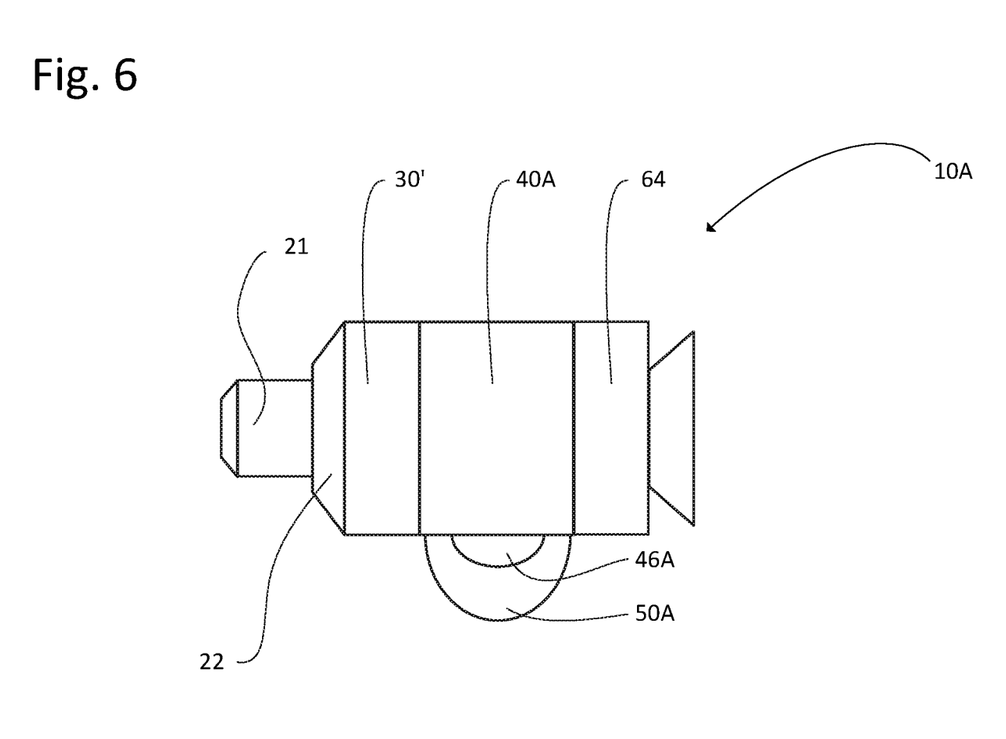
FIG. 6 is a schematic view of an embodiment of a modular lighting and ancillary component apparatus similar to that of FIG. 1, but with the modules connected and including a light-emitting module having two ends with USB connections and a speaker module connected to the light-emitting module.

FIG. 6 depicts an embodiment of a modular lighting and ancillary component apparatus 10A similar to that of FIG. 1, including a power connector (e.g., a standard screw connector) 21 and a base module body 22, but with the modules connected and including a light-emitting module 40A having two ends each with a USB connection (not shown), an ancillary module 30' having Wi-Fi functionality, and an ancillary module 64 including a speaker connected to the light-emitting module 40A. As the light-emitting module 40A is configured with USB connectors at each end, it is configured to emit light sideways through diffuser 46A and bulb 50A.

Figure 7:
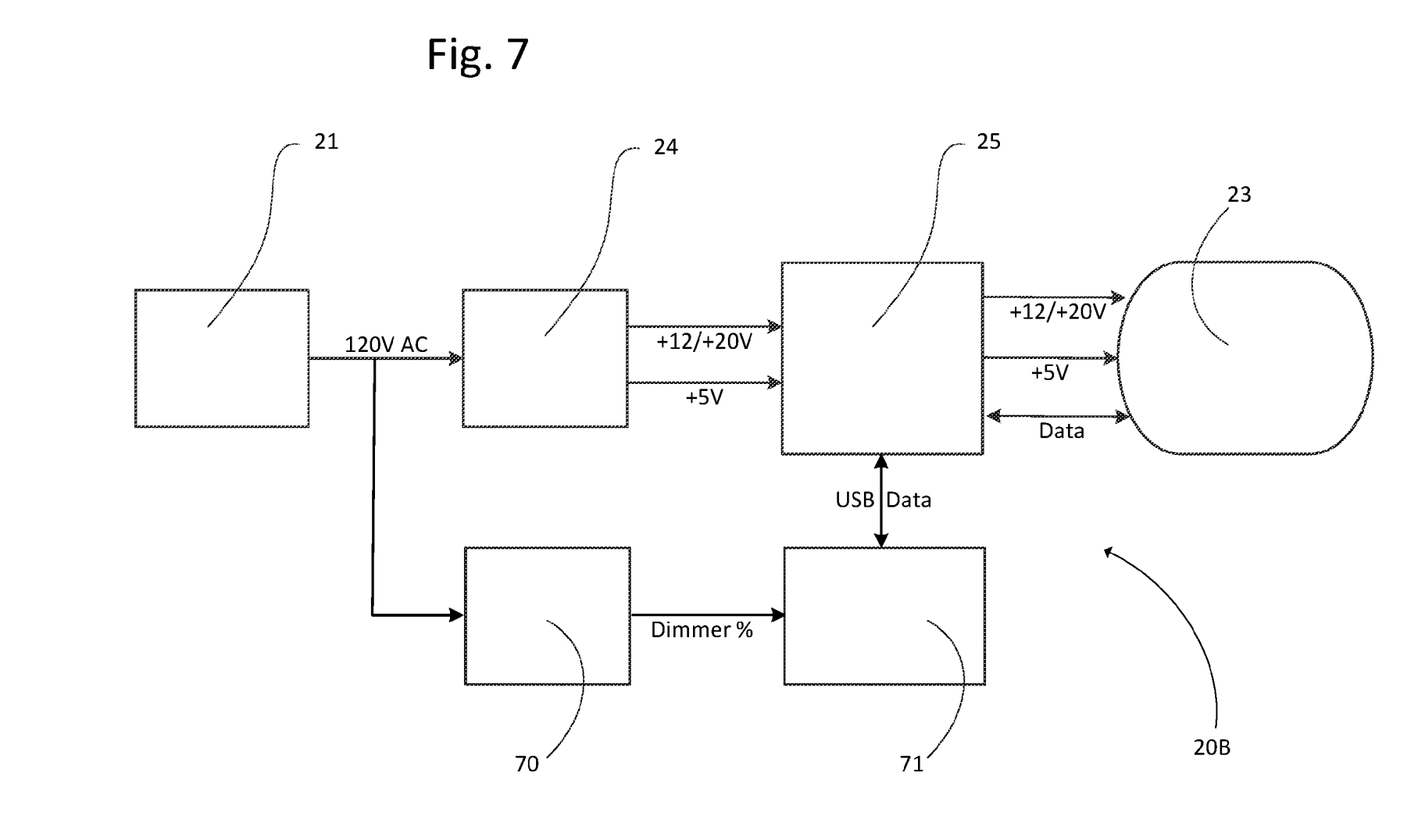
FIG. 7 is a functional block diagram of an embodiment of a base module having dimmer functionality.

In some circumstances it is possible to sense the properties of the modified AC waveform produced by a conventional residential light dimmer, and control the brightness of a digital bulb accordingly. These common dimmers are built around a triac, which gates each cycle of the AC waveform by a voltage threshold to vary the power transferred to the load. (The technique is similar to pulse-width modulation for DC circuits). In an embodiment, the dimming technique widely used in LED bulbs of analyzing the incoming AC waveform to detect properties of the wave shape and produce an appropriate scaling value can be employed. FIG. 7 shows the functional design of an embodiment of a base module 20B having dimmer functionality. The base module 20B comprises a power connector 21, a female USB connector 23, a DC power supply 24, USB-C PHY circuitry 25, a microcontroller 71, and an AC waveform detector 70. The microcontroller 71 is preferably configured so that the dimmer is partially on before the bulb control circuitry powers up, and to ensure sufficient power is available for the LED before it is illuminated. (LED lighting requiring a fraction of the power of conventional incandescent bulbs, however, the latter condition would be satisfied for most of the dimmer's potential operating range).

Figure 8:
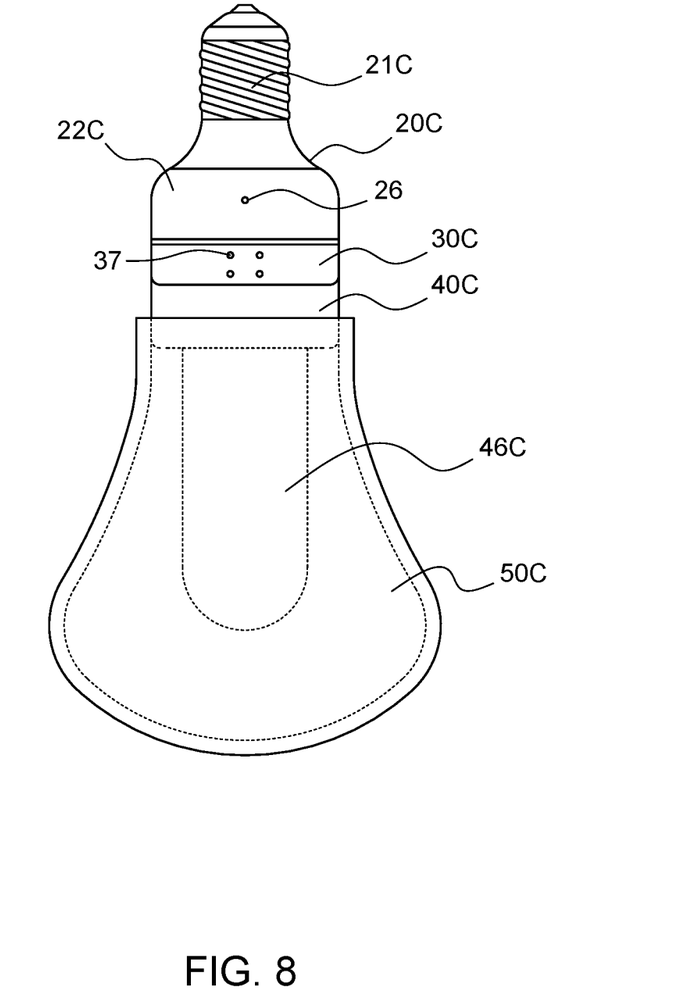
FIG. 8 is a perspective view of an embodiment of a modular lighting and ancillary component apparatus showing a connected base module, ancillary module, light-emitting module, and bulb.

Referring to FIGS. 8-11, another embodiment of a modular lighting and ancillary component apparatus 10C is shown. In FIG. 8, the base module 20C, ancillary module 30C, light-emitting module 40C, and bulb 50C are shown connected. The base module 20C in this embodiment includes a power connector 21C (e.g., a standard screw connector), a base module body 22C, and a status light indicator 26 that may be lit by an internal LED or LEDs of different colors.

Figure 9:
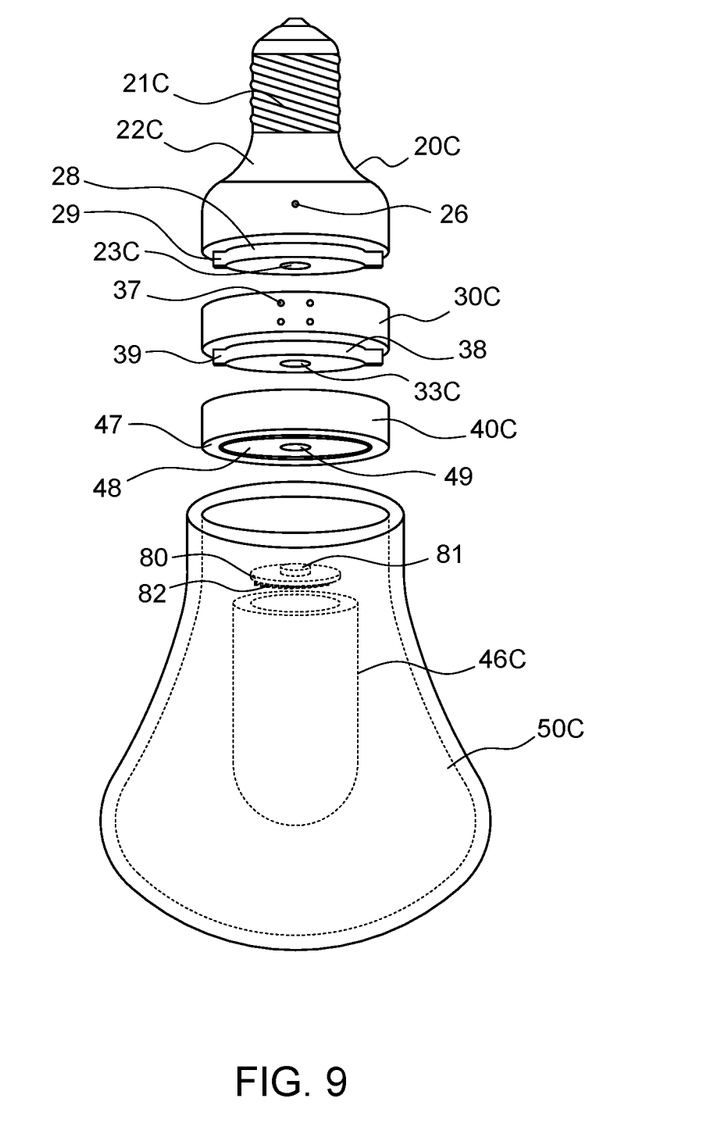
FIG. 9 is a perspective view of the embodiment of FIG. 8, showing the parts unconnected.
Figure 10:
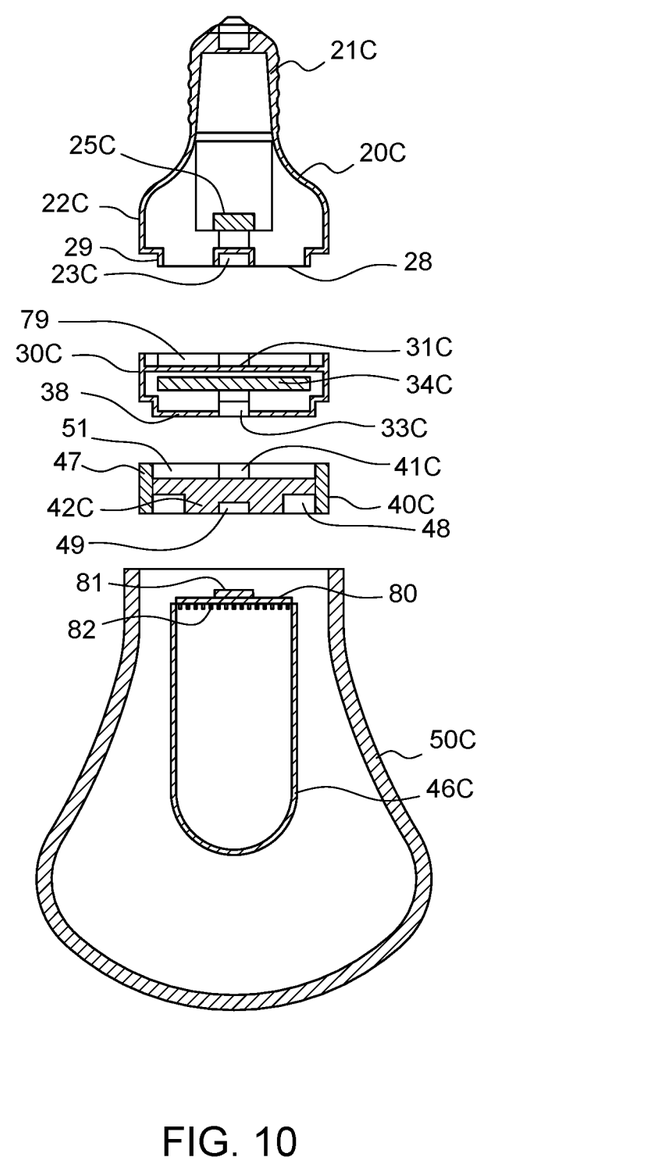
FIG. 10 is a sectional view of the embodiment of FIG. 8, showing the parts unconnected.
Figure 11:
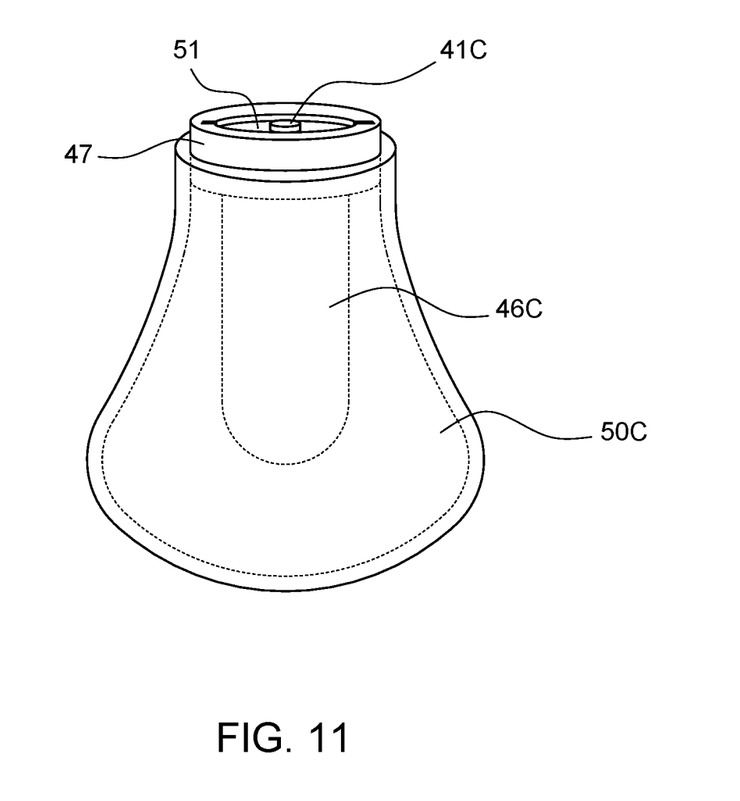
FIG. 11 is a partial perspective view of the embodiment of FIG. 8, showing a USB connector and structural connection features of the light-emitting module.

With the parts shown disconnected in FIGS. 9 and 10 it can be seen that the base module 20C also includes a male press-fit connector 28 having nubs 29 and a female USB connector 23C. Any other suitable type of physical connector can be used (e.g., a threaded a locking ring, etc.) in place of the press-fit connector 28 as long it prevents rotation of the USB connector 23C of the base module 20C with respect to the USB connector 31C of the ancillary module 30C (or other module) when the two are connected. As seen in FIG. 10, the base module 20C further includes USB-C PHY circuitry 25C.

In this embodiment the ancillary module 30C comprises a female press-fit connector 79, a microphone 37, a male press-fit connector 38 having nubs 39, and a female USB connector 33C. Referring to FIG. 10, the ancillary module 30C also includes Wi-Fi circuitry and transceiver/USB-C PHY circuitry 34C.

The light-emitting module 40C of this embodiment comprises two discrete parts: first, a light-emitting module body 42C including a silicone outer coating 47, a male USB connector 41C, a female press-fit connector 51 (seen best in FIG. 11) configured to engage the male press-fit connectors 28 and 38 of the ancillary module 30C and base module 20C, a female press-fit connector 48, and a female USB connector 49; and second, a LED circuit board 80 having a male USB connector 81 and LEDs 82. The open end of the diffuser 46C press-fits into female press-fit connector 48 and the open end of the bulb 50C press fits over silicone outer coating 47.

Figure 12:
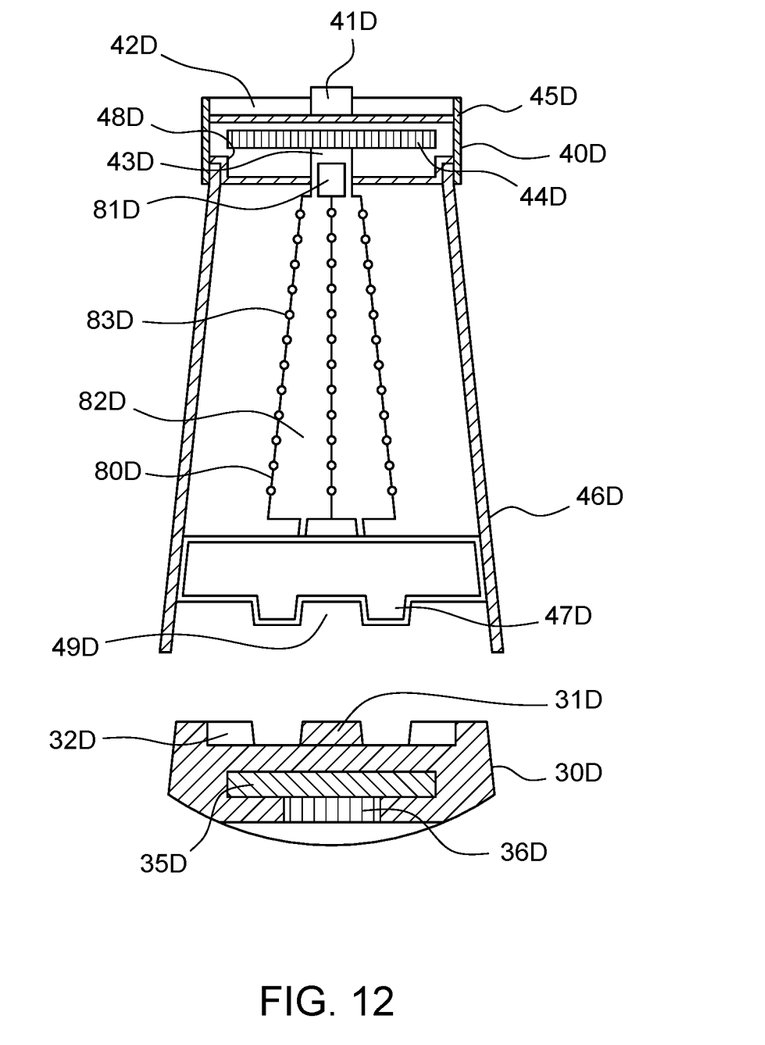
FIG. 12 is a sectional view of a combination of four modules consisting of a connected LED coupling module, LED module, and light guide module, and a camera module (unconnected).

FIG. 12 depicts a combination of four modules consisting of an LED coupling module 40D, an LED module 80D, a light guide module 46D, and a camera module 30D. The LED coupling module 40D includes a male USB connector 41D and female press-fit connector 42D, a female USB connector 43D and female press-fit connector 48D configured to receive the end of light guide module 46D, USB circuitry 44D, and an outer silicone coating 45D. The LED module 80D includes a male USB connector 81D, an LED circuit board 82D and LEDs 83D. In this embodiment, the LED module 80D and the light guide module 46D connect to the distal end of the LED coupling module 40D. The light guide module 46D, which may be made of a suitable polymer, includes a male press-fit connector 47D and a female USB connector 49D. The camera module 30D includes a male USB connector 31D and a female press-fit connector 32D, camera circuitry 35D, and camera sensor 36D.

Using various modules, a user can for example build up a lightbulb from scratch for whatever purpose is desired, and may change modules to readily adjust the lightbulb's characteristics without replacing the entire apparatus. As another example, for a bedside lamp, a user may decide to combine a base module with a USB hub module (e.g., for charging devices like a smartphone), add a speaker module (e.g., to listen to music while going to sleep), and a Wi-Fi module with circuitry that can turn the speaker on in the morning, and finally a light-emitting (e.g., LED) module, a light guide module, and a bulb.

Those in the art will understand that a number of variations may be made in the disclosed embodiments, all without departing from the scope of the invention, which is defined solely by the appended claims.

What is claimed is:

1. A modular lighting and ancillary component apparatus, comprising:
   a) a base module including USB circuitry and having a first end and a second end, the first end of the base module including a power connector, and the second end of the base module having a USB connector;
   b) at least one ancillary module including USB circuitry and having a first end and a second end, the first end of the ancillary module having a USB connector connectable to the USB connector of the base, and the second end of the ancillary module including a USB connector;
   c) a light-emitting module including USB circuitry and having a first end and a second end, the first end of the light-emitting module having a USB connector connectable to the USB connector of the second end of the ancillary module, and the light-emitting module including a light-emitting component;
   wherein an ancillary module comprises a hub module having USB circuitry and one or more external USB connectors on an external surface of the ancillary module.

2. The modular lighting and ancillary component apparatus of claim 1, wherein the USB circuitry and the USB connectors of the base module, ancillary module, and light-emitting module meet a USB-C specification.

3. The modular lighting and ancillary component apparatus of claim 1, wherein the USB circuitry of one or more modules in the modular lighting and ancillary component apparatus supports a USB Power Delivery (PD) specification.

4. The modular lighting and ancillary component apparatus of claim 1, wherein the base module includes a DC power supply and the power connector is configured to mate with a conventional AC electric lighting receptacle.

5. A modular lighting and ancillary component apparatus comprising:
   a) a base module including USB circuitry and having a first end and a second end, the first end of the base module including a power connector, and the second end of the base module having a USB connector;
   b) at least one ancillary module including USB circuitry and having a first end and a second end, the first end of the ancillary module having a USB connector connectable to the USB connector of the base, and the second end of the ancillary module including a USB connector;

c) a light-emitting module including USB circuitry and having a first end and a second end, the first end of the light-emitting module having a USB connector connectable to the USB connector of the second end of the ancillary module, and the light-emitting module including a light-emitting component;

wherein an ancillary module includes a wireless local area network transceiver.

6. The modular lighting and ancillary component apparatus of claim 5, wherein the USB circuitry and the USB connectors of the base module, ancillary module, and light-emitting module meet a USB-C specification.

7. The modular lighting and ancillary component apparatus of claim 5, wherein the USB circuitry of one or more modules in the modular lighting and ancillary component apparatus supports a USB Power Delivery (PD) specification.

8. The modular lighting and ancillary component apparatus of claim 5, wherein the base module includes a DC power supply and the power connector is configured to mate with a conventional AC electric lighting receptacle.

9. A modular lighting and ancillary component apparatus comprising:
   a) a base module including USB circuitry and having a first end and a second end, the first end of the base module including a power connector, and the second end of the base module having a USB connector;
   b) at least one ancillary module including USB circuitry and having a first end and a second end, the first end of the ancillary module having a USB connector connectable to the USB connector of the base, and the second end of the ancillary module including a USB connector;
   c) a light-emitting module including USB circuitry and having a first end and a second end, the first end of the light-emitting module having a USB connector connectable to the USB connector of the second end of the ancillary module, and the light-emitting module including a light-emitting component;
   wherein the light-emitting module includes one or more light-emitting diodes ('LEDs'), and wherein the light-emitting module includes a light-emitting module body having a first end and a second end, the first end of the light-emitting module body being coterminous with the first end of the light-emitting module, and the second end of the light-emitting module body including a LED connector, and wherein the light-emitting module further includes a LED circuit board having a first side and a second side, the first side of the LED circuit board including a USB connector and the second side of the LED circuit board including the one or more LEDs.

10. The modular lighting and ancillary component apparatus of claim 9, further comprising a light treatment component connectable to the modular lighting and ancillary component apparatus, wherein the light treatment component comprises one or more of: a light guide, a light diffuser, a bulb, and a heat dissipation component.

11. The modular lighting and ancillary component apparatus of claim 9, wherein the light-emitting module body includes USB circuitry and the LED connector is a USB connector.

12. The modular lighting and ancillary component apparatus of claim 9, wherein the USB circuitry and the USB connectors of the base module, ancillary module, and light-emitting module meet a USB-C specification.

13. The modular lighting and ancillary component apparatus of claim 9, wherein the USB circuitry of one or more modules in the modular lighting and ancillary component apparatus supports a USB Power Delivery (PD) specification.

14. The modular lighting and ancillary component apparatus of claim 9, wherein the base module includes a DC power supply and the power connector is configured to mate with a conventional AC electric lighting receptacle.

15. A modular lighting and ancillary component apparatus comprising:
   a) a base module including USB circuitry and having a first end and a second end, the first end of the base module including a power connector, and the second end of the base module having a USB connector;
   b) at least one ancillary module including USB circuitry and having a first end and a second end, the first end of the ancillary module having a USB connector connectable to the USB connector of the base, and the second end of the ancillary module including a USB connector;
   c) a light-emitting module including USB circuitry and having a first end and a second end, the first end of the light-emitting module having a USB connector connectable to the USB connector of the second end of the ancillary module, and the light-emitting module including a light-emitting component;
   wherein the light-emitting module includes an exterior surface between the first and second ends of the light-emitting module and the light-emitting component is on the exterior surface of the light-emitting module.

16. The modular lighting and ancillary component apparatus of claim 15, further comprising a light treatment component connectable to the modular lighting and ancillary component apparatus, wherein the light treatment component comprises one or more of: a light guide, a light diffuser, a bulb, and a heat dissipation component.

17. The modular lighting and ancillary component apparatus of claim 15, wherein the USB circuitry and the USB connectors of the base module, ancillary module, and light-emitting module meet a USB-C specification.

18. The modular lighting and ancillary component apparatus of claim 15, wherein the USB circuitry of one or more modules in the modular lighting and ancillary component apparatus supports a USB Power Delivery (PD) specification.

19. The modular lighting and ancillary component apparatus of claim 15, wherein the base module includes a DC power supply and the power connector is configured to mate with a conventional AC electric lighting receptacle.

20. A modular lighting and ancillary component apparatus comprising:
   a) a base module including USB circuitry and having a first end and a second end, the first end of the base module including a power connector, and the second end of the base module having a USB connector;
   b) at least one ancillary module including USB circuitry and having a first end and a second end, the first end of the ancillary module having a USB connector connectable to the USB connector of the base, and the second end of the ancillary module including a USB connector;
   c) a light-emitting module including USB circuitry and having a first end and a second end, the first end of the light-emitting module having a USB connector connectable to the USB connector of the second end of the ancillary module, and the light-emitting module including a light-emitting component;
   wherein the apparatus includes two or more ancillary modules one or more of which includes USB circuitry and has a first end and a second end each having a USB connector, the USB connector of the second end being connectable to the USB connector of the first end of the light-emitting module.

21. The modular lighting and ancillary component apparatus of claim 20, wherein the USB circuitry and the USB connectors of the base module, ancillary module, and light-emitting module meet a USB-C specification.

22. The modular lighting and ancillary component apparatus of claim 20, wherein the USB circuitry of one or more modules in the modular lighting and ancillary component apparatus supports a USB Power Delivery (PD) specification.

23. The modular lighting and ancillary component apparatus of claim 20, wherein the base module includes a DC power supply and the power connector is configured to mate with a conventional AC electric lighting receptacle.

\* \* \* \* \*